United States Patent
Zhuang et al.

(10) Patent No.: US 9,690,788 B2
(45) Date of Patent: Jun. 27, 2017

(54) FILE TYPE RECOGNITION ANALYSIS METHOD AND SYSTEM

(75) Inventors: Xiao Zhuang, Shanghai (CN); Su Lv, Shanghai (CN); Ling Li, Shanghai (CN); Xiaozhou Hu, Shanghai (CN); Zhenglin Li, Shanghai (CN); Yaoyao Zhu, Shanghai (CN)

(73) Assignee: CHINA UNIONPAY CO., LTD., Pudong, Shanghai (CN)

( * ) Notice: Subject to any disclaimer, the term of this patent is extended or adjusted under 35 U.S.C. 154(b) by 1026 days.

(21) Appl. No.: 13/142,923

(22) PCT Filed: Aug. 10, 2009

(86) PCT No.: PCT/CN2009/000904
§ 371 (c)(1),
(2), (4) Date: Jun. 30, 2011

(87) PCT Pub. No.: WO2010/075661
PCT Pub. Date: Jul. 8, 2010

(65) Prior Publication Data
US 2011/0270858 A1 Nov. 3, 2011

(30) Foreign Application Priority Data
Dec. 31, 2008 (CN) .......................... 2008 1 0205211

(51) Int. Cl.
G06F 17/30 (2006.01)
(52) U.S. Cl.
CPC .............................. G06F 17/30067 (2013.01)
(58) Field of Classification Search
CPC ................................................ G06F 17/30067
See application file for complete search history.

(56) References Cited

U.S. PATENT DOCUMENTS 5,226,163 A * 7/1993 Karsh et al.
5,299,018 A * 3/1994 Jefferson ....................... 382/245
(Continued)

FOREIGN PATENT DOCUMENTS

| CN | 1933512 A | 3/2007 |
|---|---|---|
| CN | 1991821 A | 7/2007 |
| CN | 101211353 A | 7/2008 |

OTHER PUBLICATIONS

Sybase Adaptive Server Enterprise Utility Programs for Unix Platforms; "Adaptive Server"; Sep. 1997; Copyright 1989-1997 by Sybase Inc.*

*Primary Examiner* — Ashish K Thomas
*Assistant Examiner* — Mellissa M Ohba
(74) *Attorney, Agent, or Firm* — Shumaker, Loop & Kendrick, LLP; James D. Miller

(57) ABSTRACT

A method and system for file type identifying and analyzing, are high in processing efficiency and accuracy, simple in parameter configuring and speedy in analyzing. The method for file type identifying and analyzing is a method for identifying file type read from a database and making an analysis, including the following steps: a loading step for loading file type and file format parameters into a memory; a file reading step for reading files from the memory; a file type identifying step for determining whether the read files are of the file type that can be identified by the memory; a file analyzing step for analyzing files and generating an analysis report in the event that the file type can be identified. The time required for file analysis can be effectively shortened and the accuracy of file identifying and analyzing can be ensured.

7 Claims, 3 Drawing Sheets

(56) References Cited

U.S. PATENT DOCUMENTS

| | | | |
|---|---|---|---|
| 5,303,361 A * | 4/1994 | Colwell | G06F 17/30067 |
| 5,437,028 A * | 7/1995 | Iijima | |
| 5,537,592 A * | 7/1996 | King et al. | 707/756 |
| 6,049,799 A * | 4/2000 | Mangat et al. | |
| 6,097,834 A * | 8/2000 | Krouse et al. | 382/137 |
| 7,500,017 B2 * | 3/2009 | Cseri et al. | 709/246 |
| 7,779,034 B2 * | 8/2010 | Pedersen | G06F 17/30067 |
| | | | 707/781 |
| 7,925,662 B2 * | 4/2011 | Gauthey et al. | 707/769 |
| 8,131,825 B2 * | 3/2012 | Nord | G06F 17/30067 |
| | | | 709/219 |
| 8,311,990 B2 * | 11/2012 | Martinek et al. | 707/649 |
| 2002/0083042 A1 * | 6/2002 | Sasoh | 707/1 |
| 2002/0194217 A1 * | 12/2002 | Hoffman et al. | 707/503 |
| 2003/0046317 A1 * | 3/2003 | Cseri et al. | 707/513 |
| 2003/0233321 A1 * | 12/2003 | Scolini et al. | 705/40 |
| 2005/0027750 A1 * | 2/2005 | Martin et al. | 707/200 |
| 2005/0131928 A1 * | 6/2005 | Gauthey et al. | 707/101 |
| 2005/0267915 A1 * | 12/2005 | Zhulong et al. | 707/200 |
| 2006/0294460 A1 * | 12/2006 | Chao et al. | 715/520 |
| 2007/0143378 A1 * | 6/2007 | Gorobets | 707/205 |
| 2007/0280438 A1 * | 12/2007 | Pritchett et al. | 379/88.13 |
| 2009/0132910 A1 * | 5/2009 | Cseri et al. | 715/234 |
| 2011/0270858 A1 * | 11/2011 | Zhuang et al. | 707/758 |

* cited by examiner

FILE TYPE RECOGNITION ANALYSIS METHOD AND SYSTEM

TECHNICAL FIELD

The present invention relates to data processing method and system, more particularly, to a data processing method and system for file type identifying and analyzing.

BACKGROUND

Generally, information is stored in the form of file. Also, it is arranged in the form of file. With the increasing development of data processing technology, the demands on file assorting and analyzing or the like by users are also becoming diverse.

In the prior art, as the file analyzing method, there mainly exists a method in which the general journal file is analyzed manually by using an auxiliary tool such as UltraEdit etc, for example.

The UltraEdit is a text editor which can edit text, Hex, ASCII code and can be used in place of Microsoft Notepad. English word checking, C++ and VB instruction highlighting are in-built. The UltraEdit can edit a plurality of files simultaneously and will not run slowly even if a very large file is being opened. The software has functions of HTML Tag color displaying, search and substituting, and unrestrained restoring. Typically, the UltraEdit can be used to modify the .EXE or .DLL file.

However, the above described analyzing method using UltraEdit or the like presents the following problems: the workload is heavy, the analysis result is inaccurate and the analysis needs to be conducted manually. Moreover, when the file is too large, the problem of not being able to be processed correctly or being low in processing efficiency occurs.

SUMMARY OF THE INVENTION

In view of the above problems, the invention aims to provide a method and system for file type identifying and analyzing, which is high in processing efficiency and accuracy, simple in parameter configuring and speedy in analyzing.

The method for file type identifying and analyzing according to the first aspect of the invention is a method for identifying the type of file read from a database and making an analysis, and the method may comprise the following steps:

a loading step for loading file type and file format parameters into a memory;

a file reading step for reading files from the memory;

a file type identifying step for determining whether the read files are of the file type that can be identified by the memory; and a file analyzing step for analyzing files and generating an analysis report if the file type can be identified.

Preferably, in the file type identifying step, a corresponding file type is matched in the memory according to the file name, and a corresponding file format is searched in the memory according to the matched file type.

Preferably, in the file analyzing step, the line length, field divider, terminator, field string format are determined according to different rules for different types of files.

Preferably, the file analyzing step further comprises the following steps:

opening the file, reading file content of designated number of lines once, determining whether the manner in which each line ends is correct according to the requirements on file type under specified specification(s), discarding the erroneous lines and indicating it in the analysis report;

summing up the lengths in the file formats according to the matched file formats and compare the sum with the length of the line, discarding the line if the sum is different from the length of the line and indicating it in the analysis report;

dividing the line based on the length of each field in the file formats, matching the divided data with a corresponding field name and domain number, the dividing of the line being completed after all of the corresponding file formats in the memory are used; storing divided result in the memory; and displaying the divided result in the memory and corresponding information on the file formats with an interface.

Preferably, the file analyzing step further comprises the following steps:

opening the file, reading designated bytes of file content, lining up the read content according to designated number of characters, and loading them into the memory;

fetching the content in the first line of files in the memory, and for the first three characters, searching all corresponding file formats from the memory according to the file type and record type code;

dividing data of said file format;

dividing the first three characters for the remaining file content of the line after the segment number of said record type is divided, searching file formats in combination with file type, and likewise dividing the data for this file formats until reading designated bytes of file content is completed;

displaying the file content with an interface.

Preferably, the dividing step comprises the following step:

fetching the following four characters from the file and converting them into binary and checking the converted binary; if the value is 1, searching file formats of this segment number in file format memory, dividing the line file content according to the length of field and loading the divided content into memory in such a way that the divided content is matched with the field name and domain number into the memory; fetching the remaining content in the upper line and the lower line to continue dividing when the length of the line is not enough for dividing.

Preferably, between the file type identifying step and the file analyzing step, the method further comprises:

a step of determining whether the files are large file;

opening the files page by page to be analyzed if it is determined that the files are the large file.

Preferably, a fuzzy match step for fuzzily matching the read file is included, the fuzzy match step comprises:

a step of obtaining file names of the read files;

determining whether the file names are fuzzily matched;

distinguishing the type of the files and attributes if the file names are fuzzily matched, and directly outputting an analysis report if the file names are not fuzzily matched.

The system for file type identifying and analyzing according to the second aspect of the invention is used for identifying type of file read from a database and making an analysis, and the system comprises:

a loading unit for loading file type and file format parameters into a memory;

a file reading unit for reading files from the memory;

a file type identifying unit for determining whether the read files are of the file type that can be identified by the memory; and a file analyzing unit for analyzing files and generating an analysis report if it is determined by the file type identifying unit that the file type can be identified.

Preferably, the system further comprises:

a determining unit for determining whether the read files by the file read unit are a large file, the determining unit opens the files page by page to be analyzed if it is determined that the files are the large file.

Preferably, the system further comprises a fuzzy matching unit for performing fuzzily matching the read files, the fuzzy matching unit comprises:

a file name obtaining unit for obtaining file names of the read files;

a determining unit for determining whether the filenames obtained by the file name obtaining unit are fuzzily matched, the types of the files and attributes in case of being fuzzily matched, and directly outputting an analysis report in case of not be fuzzily matched.

The file type can be identified automatically and the file can be analyzed automatically as above discussed according to the present invention. Various types of files can be automatically identified and analyzed in accordance with the input file type and format parameters without modifying the application system, and the analysis report can be output by the interface. Thus, the method and system for automatically identifying and analyzing various types of file, such as general journal file, among memories are achieved in the widespread used Windows platform. The present invention therefore has such advantages as being simple in parameter configuring, speedy and accurate in analyzing, greatly shortening the time for file analysis during event processing and testing, and effectively improves work efficiency.

DETAILED DESCRIPTION

Figure 1:
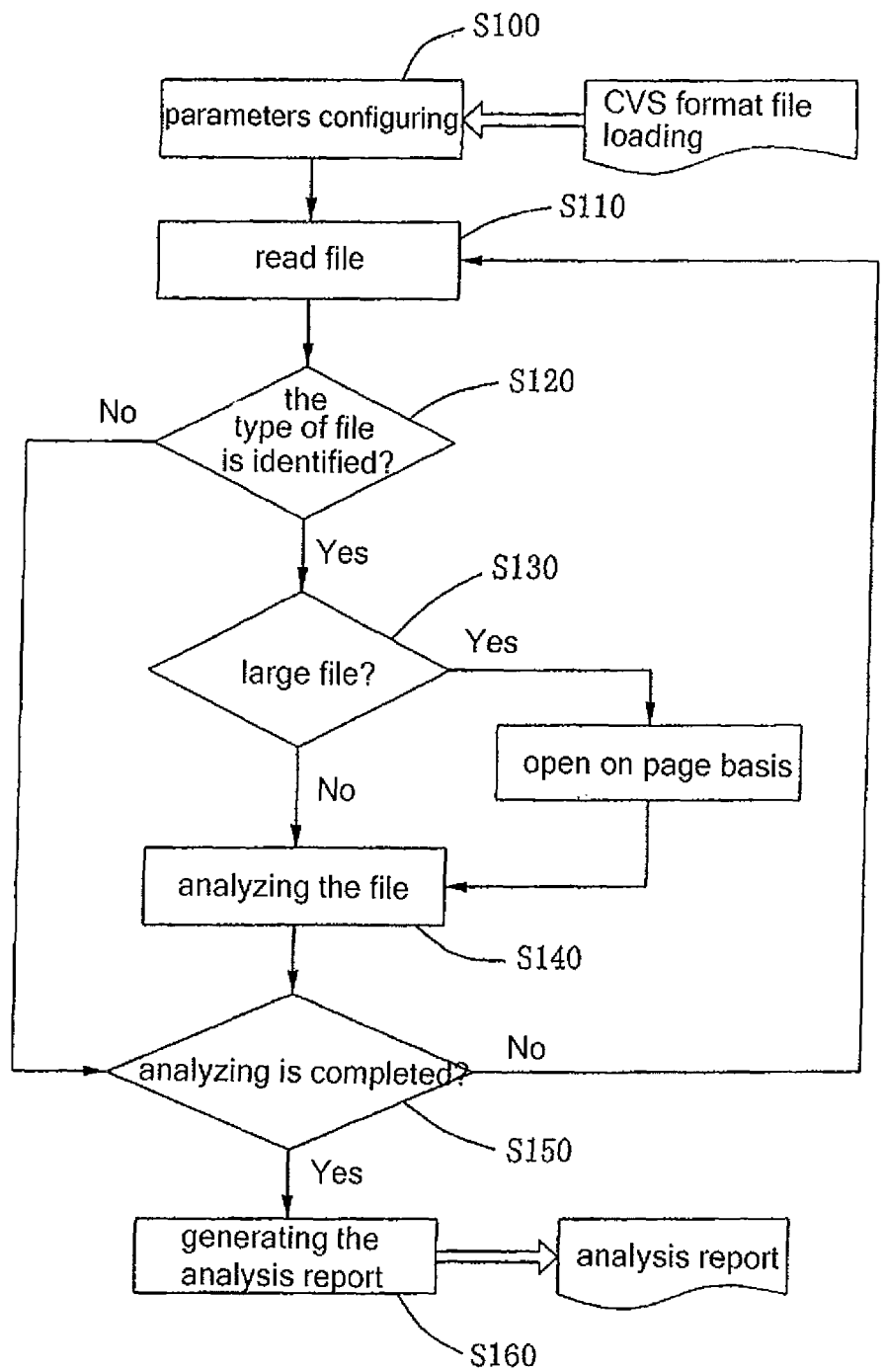
FIG. 1 is a flowchart showing the method for file type identifying and analyzing according to the invention.

FIG. 1 is a flowchart showing the method for file type identifying and analyzing according to the invention.

As shown in FIG. 1, the method for identifying and analyzing the type of a file which is read from a database comprises the following steps:

a loading step (S100) for loading the file type(s) and file format parameters into a memory; a file reading step (S110) for reading file(s) from the memory; a file type identifying step (S120) for determining whether the read file(s) is of the file type that can be identified by the memory; a file analyzing step (S140) for analyzing file(s) and generating an analysis report in case that the type(s) of the read file(s) can be identified.

A determining step (S130) for determining whether the file(s) is a large file can be provided between the file type identifying step (S120) and the file analyzing step (S140). The read file is opened on a page basis (e.g., each page is 64×5 KB) and is analyzed if it is determined as a large file, for example, hundreds of megabyte or even gigabyte.

Additionally, the file(s) can be assorted into lined general journal file or non-lined general journal file. The lined general journal file herein refers to the file that each line of the file has the same format and length and each line represents one transaction; whereas the non-lined general journal file means the file in which a plurality of transactions can be included and the plurality of transactions are displayed as a whole in one line and in which the file formats are non-fixed. The specific formats of lined general journal file typically depend on the initial transaction type code and hexadecimal bitmap of the general journal file.

Specifically, the steps of analyzing lined files as above discussed further comprises the following steps:

opening the file, reading file content in designated number of lines once, determining whether the way in which each line ends is correct according to the requirements on file type under specified specification(s), discarding the erroneous lines and indicating it in the analysis report;

summing up the lengths in the file formats according to the matched file formats and compare the sum with the length of the line, discarding that line for which the sum is different from the length and indicating it in the analysis report;

dividing the line based on the length of each field in the file formats, matching the divided data with a corresponding field name and domain number, the dividing of the line being completed after all of the corresponding file formats in the memory are used; storing the result of dividing in the memory; and displaying the divided result in the memory and corresponding information on the file formats with an interface.

Furthermore, the step of analyzing non-lined general journal file further comprises the following steps:

opening the file, reading file content in designated bytes, lining the read content according to designated number of characters, and loading them into the memory;

fetching the content of the first line in the memory, for example the first three characters (record type code), finding out all corresponding file formats (e.g., the name of field, the length of field, the domain number, etc.) from the memory according to the file type and the record type code;

dividing the line according to the length of field and storing the divided content into the memory in such a way matching the divided content with a field name and domain number; fetching the remaining content in the upper line and the lower line to continue dividing when the length of the line is not enough to be divided;

dividing the first three characters for the remaining file content of the line after the segment number of said record type is totally divided, searching file formats in combination with the file type, and likewise dividing the data for the file formats until reading designated bytes of file content is completed;

displaying the file content with an interface, for example, the name of field, the content of the field, the length of field, the domain number, etc.

wherein, the dividing above described comprises the following step:

fetching the following four characters from the file and converting them into binary and checking the converted binary; if the value is 1, searching file formats of this segment number in file format memory, dividing the file content in the line according to the length of field and loading the divided content into the memory in such a way matching them with the field name and domain number; fetching the remaining content in the upper line and the lower line to continue dividing when the length of the line is not enough to be divided.

The line length, field divider, terminator, filed string format and so on can be determined from different rules for different types of files during analyzing of the file as above described. Fox example, when the present invention is applied to a bank system to analyze the file type, the obtained information with respect to the message domain and the obtained information with respect to the database field can be analyzed, the principal, commission charge, transaction in the file can be statistically analyzed, and the analyzed result can be formed into memory log.

Figure 2:
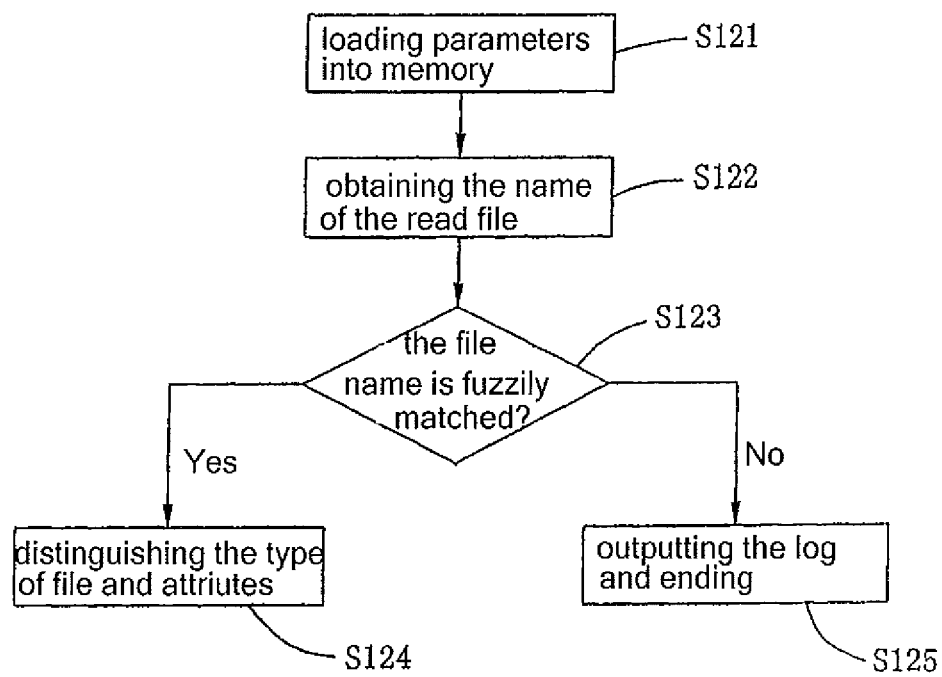
FIG. 2 is a flowchart of file type identifying steps of the method for file type identifying and analyzing according to the invention.

FIG. 2 is a flowchart showing the steps of identifying the file type according to the invention.

As shown in FIG. 2, parameters are first loaded into the memory (S121) during the identifying of file type according to the invention, then the name of the read file is obtained (S122), and it is subsequently determined whether the file name is fuzzily matched (S123).

The specific name of the read file is first converted into a general name of the file type in determining whether the file name is fuzzily matched. The converting is conducted by a rule in which "year" is converted into "YY" or "YYYY", "month" into "MM", "date" into "DD", other numbers into "?", and English characters are not to be converted. For example, "IND2008100899AC0M", name of a read file, is converted into "INDYYMMDD??ACOM"; "SF20081008", name of a read file, is converted into "SFYYYYMMDD". Finally, the converted general name of the file type is searched in the parameters in the memory; if they are found, the process continues, and if they are not found, a log report is outputted and the process ends.

The method for identifying and analyzing the file type as above described can be implemented by a file type identifying and analyzing system described below and shown in block diagram form in FIG. 3.

Figure 3:
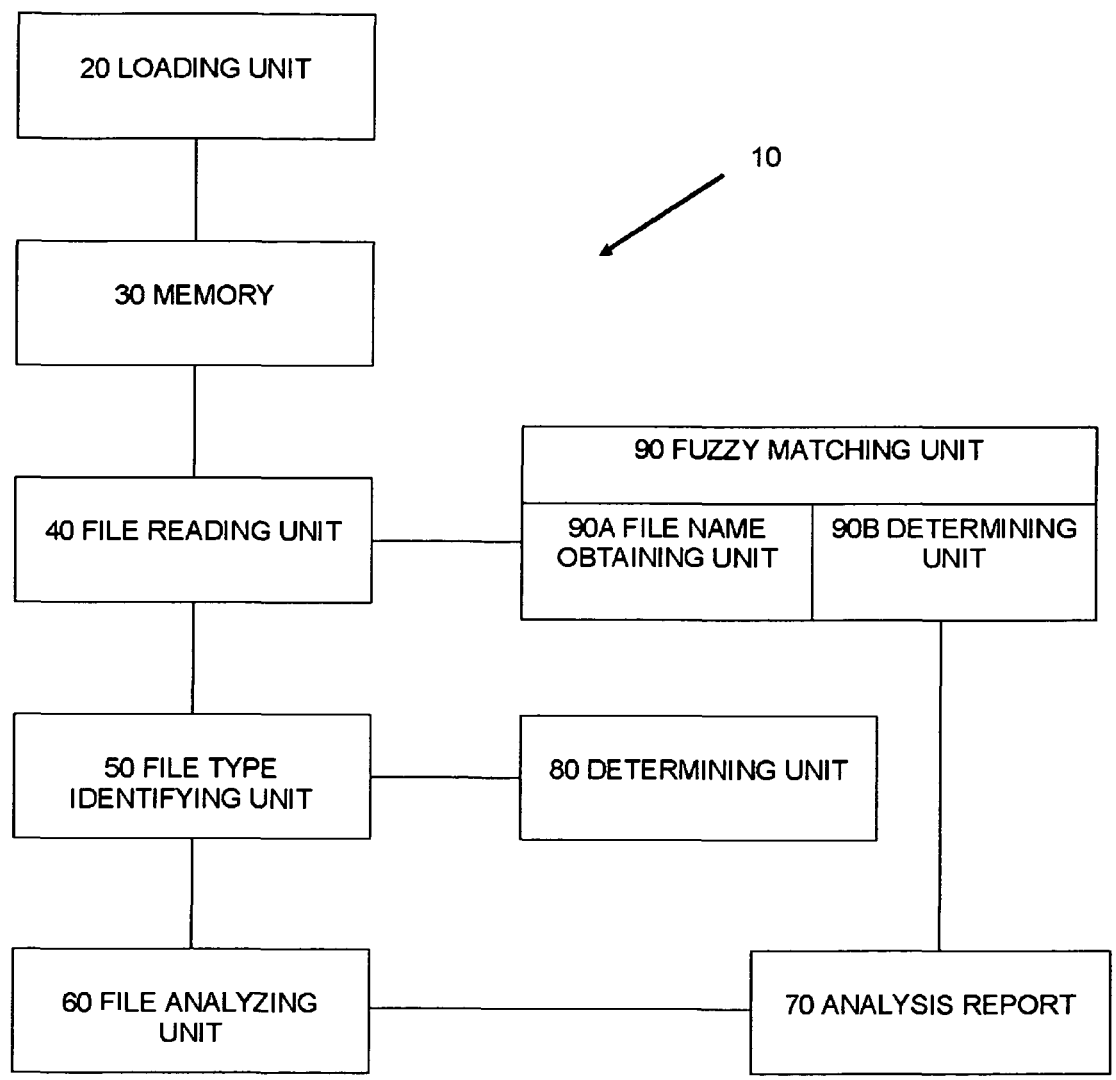
FIG. 3 is a block diagram of the system for performing the method for file type identifying and analyzing according to the invention.

The file type identifying and analyzing system 10 shown in FIG. 3 comprises a loading unit 20 for loading the type(s) and file format parameters into a memory 30; a file reading unit 40 for reading file(s) from the memory 30; a file type identifying unit 50 for determining whether the read file(s) is of the file type that can be identified by the memory 30; and a file analyzing unit 60 for analyzing the file(s) and generating an analysis report 70 if the file type identifying unit 50 determines that the type(s) of the read file(s) can be identified.

The file type identifying and analyzing system 10 can further comprise a determining unit 80 for determining whether the read file(s) read by the file read unit 40 is a large file. The file analyzing unit 60 opens the file page by page for analyzing if the file is determined to be a large file.

Further, the file type identifying and analyzing system 10 can further comprise a fuzzy matching unit 90 for a fuzzy matching of the read file, the fuzzy matching unit 90 comprises a file name obtaining unit 90A for obtaining the file name of read file; and a determining unit 90B for determining whether the file name obtained by the file name obtaining unit 90A is fuzzily matched, distinguishing the file type and its attribute if fuzzily matched, and directly outputting an analysis report 70 if the file name is not fuzzily matched.

The file type can be identified automatically and the file can be analyzed automatically by using the file type identifying and analyzing system as above discussed according to the present invention. Various types of files can be automatically identified and analyzed in accordance with the input file type and format parameters without modifying the application system, and the analysis report can be output by the interface. Thus, the method and system for automatically identifying and analyzing various types of file, such as general journal file, among memories are achieved in the widespread used Windows platform.

Therefore, the present invention has such advantages as being simple in parameter configuring, speedy and accurate in analyzing, greatly shortening the time for file analysis during event processing and testing, and effectively improves work efficiency. That is, with the present invention, the time required for analyzing file can be effectively reduced while ensuring the accuracy of file identifying and analyzing.

In the drawings and specification as above discussed, there have been disclosed typical embodiments of the invention and they are used in a generic and descriptive sense only and not for the purpose of limitation. It is apparent to those skilled in the art that many changes and modifications can be made to the invention. However, any modification, equivalent and variation made within the spirit and principle of the invention will fall within the scope of protection of the appended claims.

What is claimed is:

1. A method for file type identifying and analyzing, used for identifying a type of file read from a database and making an analysis, the method comprising:
   a loading step for loading file types and parameters of file formats into a memory;
   a file reading step for reading a file from the memory;
   a file type identifying step for determining whether the read file is of one of the file types that are identifiable for the memory;
   a step of determining whether the read file is a large file, wherein the read file is determined to be the large file when the read file exceeds a first designated number of bytes of information;
   a file analyzing step for analyzing the read file and generating an analysis report when the read file is determined to be of one of the file types that are identifiable for the memory, wherein the file analyzing step is conducted independently for each page of the read file when the read file is determined to be the large file, wherein each page of the read file corresponds to a second designated number of bytes of the read file into which the read file is divisible;
   wherein a line length, a field divider, a terminator, and a field string format are determined according to different rules for different types of files in the file analyzing step; and
   wherein, the file analyzing step further comprises:
   opening the read file, reading content of a designated byte size from the read file, lining up the read content according to a designated number of characters, and loading the lined up content into the memory;
   fetching the content in the first line of the read file in the memory, and for a first three characters of the content, searching the file formats from the memory according to the file type and a record type code;
   dividing data of said file format;
   dividing the first three characters for the remaining file content of the line after a segment number of said record type code is divided, searching file formats in combination with file type, and dividing the data for the file formats until reading of the designated bytes of file content is completed; and
   displaying the file content with an interface.

2. The method for file type identifying and analyzing according to claim 1, wherein, in the file type identifying step, a corresponding file type is matched in the memory according to a file name of the read file, and a corresponding file format is searched in the memory according to the matched file type.

3. The method for file type identifying and analyzing according to claim 2, wherein, the file analyzing step further comprises the following steps:

opening the read file, reading file content of a designated number of lines of the read file once, determining whether the manner in which each line ends is correct according to requirements on file type under specified specification(s), and discarding any erroneous lines and indicating the discarding in the analysis report;

summing up line lengths in the file format according to the matched file type and comparing the sum with a length of each of the lines, discarding the line of which the length is different than the sum and indicating the difference between the length of the discarded line and the sum in the analysis report;

dividing each of the lines based on a length of each of fields in the file format, matching the divided data with a corresponding field name and a domain number, the dividing each of the lines being completed until all of the file formats in the memory are used;

storing the divided result in the memory; and displaying the divided result in the memory and corresponding information on file format with an interface.

4. The method for file type identifying and analyzing according to claim 1, wherein, the dividing step comprises the following step: fetching a following four characters from the first line of the read file and converting them into binary and checking the converted binary; if a value of the converted binary is 1, searching the file formats with the segment number in file format memory, dividing the file content according to a length of field and loading the divided file content into the memory with matching the divided content with a field name and a domain number.

5. The method for file type identifying and analyzing according to claim 1, wherein, the method further comprising a fuzzy match step for fuzzily matching the read file, wherein the fuzzy match step comprises:

a step of obtaining file names of the read files;

determining whether the file names are fuzzily matched;

distinguishing the type of the files and attributes if the file names are fuzzily matched, and directly outputting an analysis report if the file names are not fuzzily matched.

6. A system for file type identifying and analyzing, used for identifying type of file read from a database and making an analysis, the system comprising:

a loading unit for loading file types and parameters of file formats into a memory;

a file reading unit for reading a file from the memory;

a file type identifying unit for determining whether the read file is one of the file types that are identifiable for the memory;

a determining unit for determining whether the read file is a large file, wherein the read file is determined to be the large file when the read file exceeds a first designated number of bytes of information; and a file analyzing unit for analyzing the read file and generating an analysis report if the file type identifying unit determines that the read file is one of the file types identifiable for the memory, wherein the file analyzing step is conducted independently for each page of the read file when the read file is determined to be the large file, wherein each page of the read file corresponds to a second designated number of bytes of the read file into which the read file is divisible; and wherein, the file analyzing unit for analyzing step further comprises:

opening the read file, reading content of a designated byte size from the read file, lining up the read content according to a designated number of characters, and loading the lined up content into the memory;

fetching the content in the first line of the read file in the memory, and for a first three characters of the content, searching the file formats from the memory according to the file type and a record type code;

dividing data of said file format; dividing the first three characters for the remaining file content of the line after a segment number of said record type code is divided, searching file formats in combination with file type, and dividing the data for the file formats until reading of the designated bytes of file content is completed; and displaying the file content with an interface.

7. The system for file type identifying and analyzing according to claim 6, wherein, the system further comprising a fuzzy matching unit for fuzzily matching the read files, wherein the fuzzy matching unit comprises:

a file name obtaining unit for obtaining file names of the read files; and a determining unit for determining whether the file name obtained by the file name obtaining unit is fuzzily matched, distinguishing the type of the file and attributes when the file name is fuzzily matched, and directly outputting an analysis report when the file name is not fuzzily matched.

* * * * *